(12) United States Patent
Paquette et al.

(10) Patent No.: US 9,267,490 B1
(45) Date of Patent: Feb. 23, 2016

(54) AEROELASTICALLY COUPLED BLADES FOR VERTICAL AXIS WIND TURBINES

(75) Inventors: Joshua Paquette, Albuquerque, NM (US); Matthew F. Barone, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 742 days.

(21) Appl. No.: 13/590,903

(22) Filed: Aug. 21, 2012

(51) Int. Cl.
*F03D 3/06* (2006.01)
*F03D 3/00* (2006.01)

(52) U.S. Cl.
CPC ........... *F03D 3/061* (2013.01); *F03D 3/005* (2013.01); *F05B 2240/212* (2013.01); *F05B 2240/214* (2013.01); *Y02E 10/74* (2013.01)

(58) Field of Classification Search
CPC .......... F03D 3/005; F03D 3/02; F03D 3/061; F05B 2240/211; F05B 2240/212; F05B 2240/213; F05B 2240/214; F05B 2240/301; F05B 2240/31; F05B 2240/311; F05B 2240/3121; F05B 2240/313; Y02E 10/74
See application file for complete search history.

(56) References Cited

U.S. PATENT DOCUMENTS

| | | | |
|---|---|---|---|
| 4,264,279 A * | 4/1981 | Dereng | 416/227 A |
| 5,405,246 A | 4/1995 | Goldberg | |
| H002057 H | 1/2003 | Veers et al. | |
| 7,153,090 B2 * | 12/2006 | DeLeonardo et al. | 415/4.2 |
| 7,344,360 B2 | 3/2008 | Wetzel | |
| 7,849,596 B2 | 12/2010 | Sauer et al. | |
| 7,948,111 B2 * | 5/2011 | Nigam et al. | 290/55 |
| 8,061,993 B2 | 11/2011 | Sassow | |
| 8,096,750 B2 | 1/2012 | McEntee et al. | |
| 2009/0129928 A1 | 5/2009 | Sauer et al. | |
| 2012/0141274 A1 | 6/2012 | Wilson | |
| 2013/0156585 A1 * | 6/2013 | Mangano | 416/210 R |
| 2013/0183164 A1 * | 7/2013 | Silvert et al. | 416/244 R |

FOREIGN PATENT DOCUMENTS

| | | | |
|---|---|---|---|
| DE | 2948060 A1 * | 6/1981 | |
| WO | WO 2005061173 A1 * | 7/2005 | |
| WO | WO 2011117276 A2 * | 9/2011 | |

OTHER PUBLICATIONS

Machine translation of WO 2011/117276 A2 (Sep. 29, 2011).*

* cited by examiner

*Primary Examiner* — Ninh H Nguyen
*Assistant Examiner* — Christopher R Legendre
(74) *Attorney, Agent, or Firm* — Daniel J. Jenkins

(57) ABSTRACT

Various technologies described herein pertain to a vertical axis wind turbine blade configured to rotate about a rotation axis. The vertical axis wind turbine blade includes at least an attachment segment, a rear swept segment, and optionally, a forward swept segment. The attachment segment is contiguous with the forward swept segment, and the forward swept segment is contiguous with the rear swept segment. The attachment segment includes a first portion of a centroid axis, the forward swept segment includes a second portion of the centroid axis, and the rear swept segment includes a third portion of the centroid axis. The second portion of the centroid axis is angularly displaced ahead of the first portion of the centroid axis and the third portion of the centroid axis is angularly displaced behind the first portion of the centroid axis in the direction of rotation about the rotation axis.

12 Claims, 8 Drawing Sheets

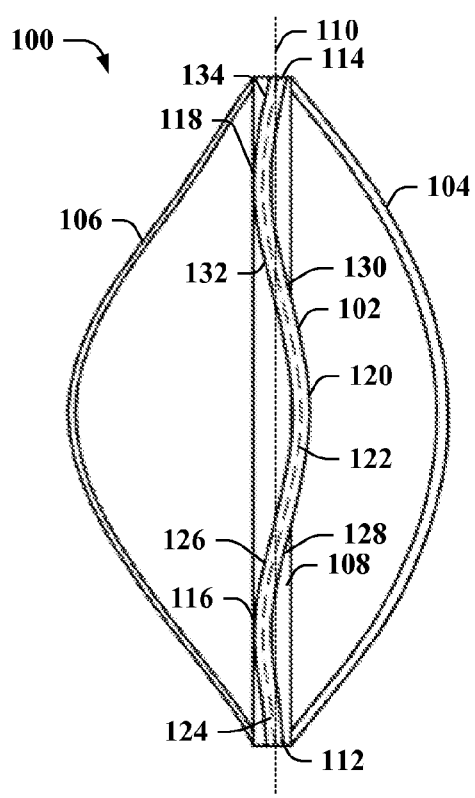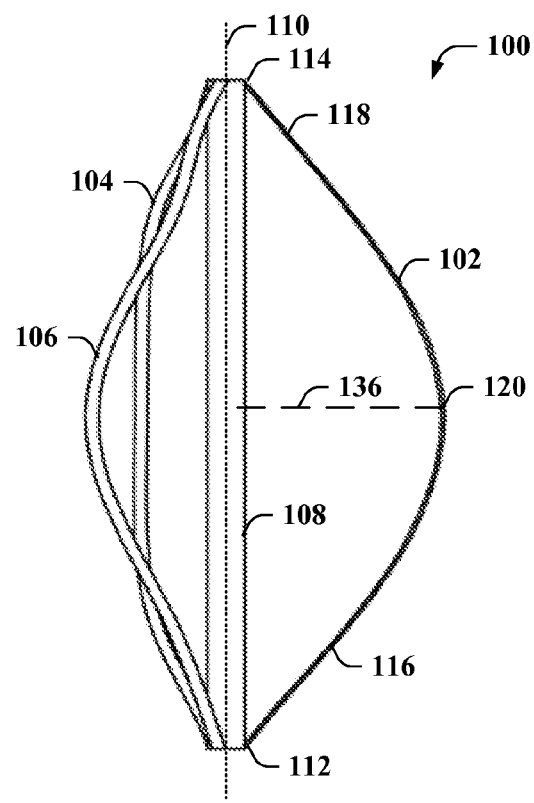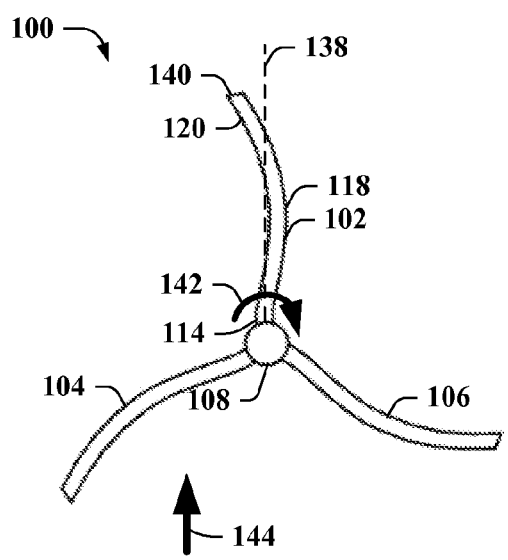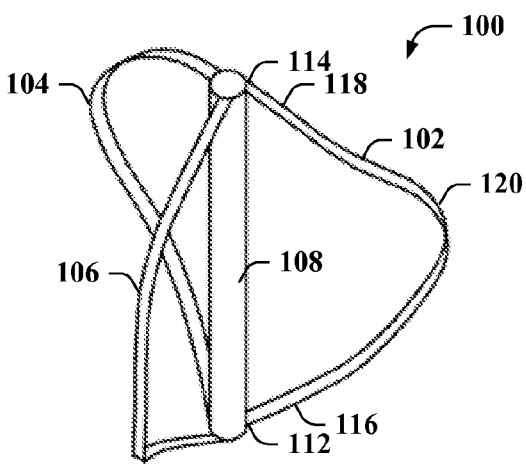
FIG. 1
FIG. 2
FIG. 3
FIG. 4

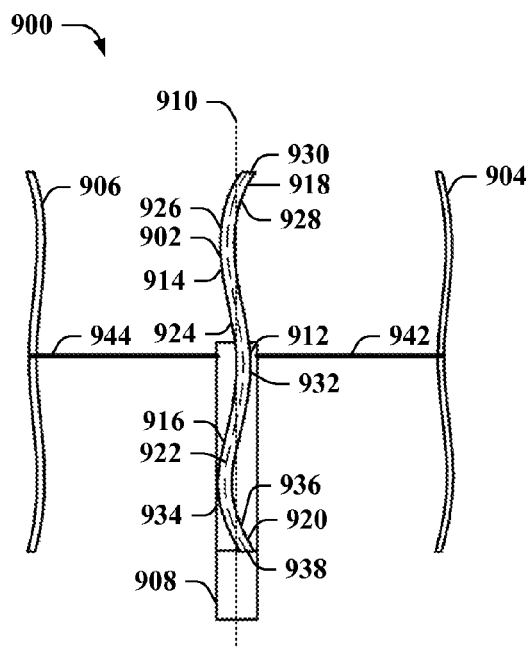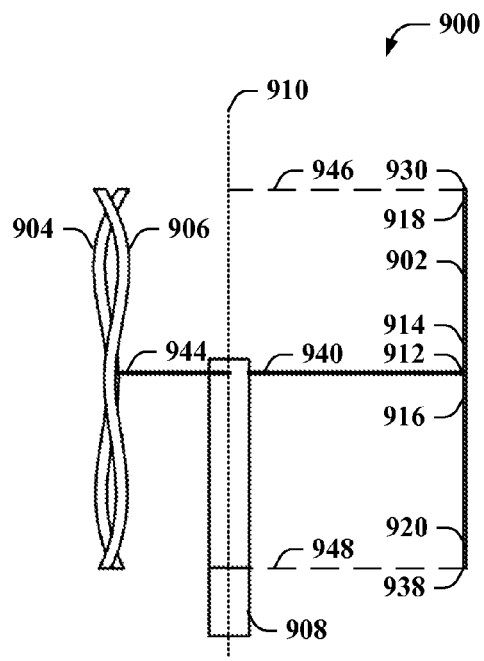
FIG. 9     FIG. 10
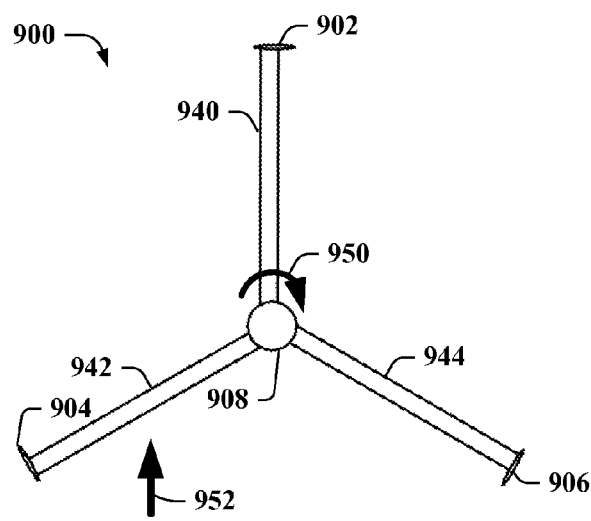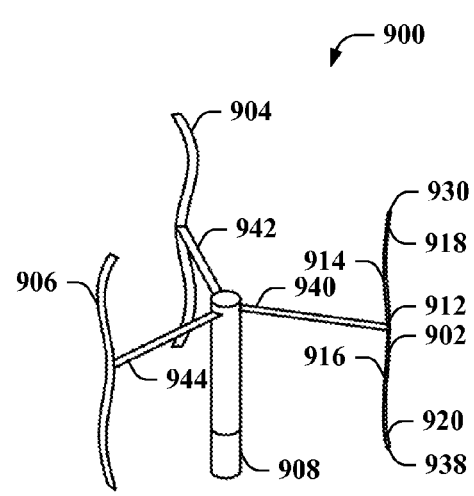
FIG. 11     FIG. 12

AEROELASTICALLY COUPLED BLADES FOR VERTICAL AXIS WIND TURBINES

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

A wind turbine is a device that converts kinetic energy from the wind into mechanical energy. The mechanical energy can further be used to produce electricity. A wind turbine can rotate about either a horizontal axis or a vertical axis. A wind turbine that rotates about a horizontal axis is referred to as a horizontal axis wind turbine, and a wind turbine that rotates about a vertical axis is referred to as a vertical axis wind turbine.

A horizontal axis wind turbine typically has a main rotor shaft and electrical generator at the top of a tower, where the main rotor shaft is commonly pointed into the wind to generate electric power. Oftentimes, a blade of a horizontal axis wind turbine continuously produces power in a revolution around a rotation axis. Further, horizontal axis wind turbines are conventionally controlled in various manners. For instance, a speed at which blades of a horizontal axis wind turbine rotate is oftentimes controlled by a connection to an electrical grid. Moreover, torque produced by the horizontal axis wind turbine can be controlled by pitching the blades of the horizontal axis wind turbine. According to an example, a control system of a horizontal axis wind turbine can adjust blade pitch to maintain the torque of the rotor to be within operating limits as wind speed changes. Following this example, the blades of the horizontal axis wind turbine can be feathered, where an angle of attack is minimized by turning the blades to be parallel to airflow, to stop the machine when wind speed exceeds a maximum cut-out speed.

In contrast to a horizontal axis wind turbine, a vertical axis wind turbine has a main rotor shaft arranged vertically; thus, the vertical axis wind turbine need not be pointed into the wind to operate. As opposed to continuously producing power through a revolution, a blade of a vertical axis wind turbine produces power in two bursts within a revolution around the rotation axis (e.g., the blade sweeps through the air in an upwind pass and a downwind pass). However, significant pulsatory torque can be produced during each revolution of a blade in the upwind and downwind passes, which can result in machine fatigue. Further, conventional vertical axis wind turbines can be prone to damage due to going into overspeed (e.g., if a connection with an electrical grid is lost or a brake of the vertical axis wind turbine fails). Often, conventional blade pitching used for horizontal axis wind turbines may be unable to be employed for vertical axis wind turbines.

SUMMARY

Described herein are various technologies that pertain to a vertical axis wind turbine blade configured to rotate about a rotation axis. The vertical axis wind turbine blade includes at least an attachment segment, a rear swept segment, and optionally, a forward swept segment. The attachment segment is contiguous with the forward swept segment, and the forward swept segment is contiguous with the rear swept segment. The attachment segment includes a first portion of a centroid axis, the forward swept segment includes a second portion of the centroid axis, and the rear swept segment includes a third portion of the centroid axis. The second portion of the centroid axis is angularly displaced ahead of the first portion of the centroid axis and the third portion of the centroid axis is angularly displaced behind the first portion of the centroid axis in the direction of rotation about the rotation axis. In various embodiments, the vertical axis wind turbine blade can lack the forward swept segment; in accordance with such embodiments, the attachment segment is contiguous with the rear swept segment.

According to various embodiments, the vertical axis wind turbine blade can be included in a Darrieus vertical axis wind turbine, a U-shaped vertical axis wind turbine, a V-shaped vertical axis wind turbine, an H-shaped vertical axis wind turbine, or the like. For instance, in a Darrieus vertical axis wind turbine, the vertical axis wind turbine blade can further include a second forward swept segment and a second attachment segment, where the second forward swept segment is contiguous with the rear swept segment, and the second attachment segment is contiguous with the second forward swept segment. By way of another illustration, in an H-shaped vertical axis wind turbine, the vertical axis wind turbine blade can further include a second forward swept segment and a second rear swept segment; the second forward swept segment can be contiguous with the attachment segment, and the second rear swept segment can be contiguous with the second forward swept segment.

Vertical axis wind turbine blades provided herein can twist in proportion to a rate of rotation about a rotation axis to passively control overspeed. Moreover, the vertical axis wind turbine blades can twist into an airflow direction when the vertical axis blades are aerodynamically loaded to smooth cyclic load and power variation. According to other embodiments, a vertical axis wind turbine blade can twist in proportion to a rate of rotation about the rotation axis to passively control overspeed and twist into an airflow direction when the vertical axis wind turbine blade is aerodynamically loaded to smooth cyclic load and power variation due to orientation of fibers of an orthotropic laminate within a blade structure.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIGS. 1-4 illustrate an exemplary sweep-twist-coupled Darrieus vertical axis wind turbine.

FIGS. 9-12 illustrate an exemplary sweep-twist-coupled H-shaped vertical axis wind turbine.

DETAILED DESCRIPTION

Figure 5:
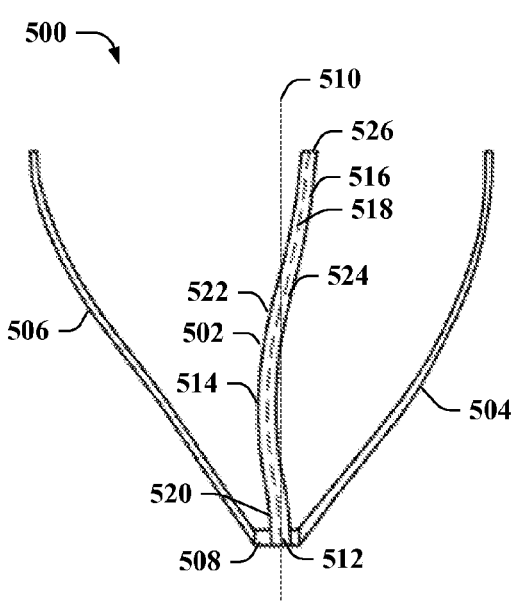
FIGS. 5-8 illustrate an exemplary sweep-twist-coupled U-shaped vertical axis wind turbine.

Various technologies pertaining to vertical axis wind turbine blades are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the term "centroid axis" refers to a locus of points corresponding to respective centroids of airfoil cross-sections of a vertical axis wind turbine blade along a span of the vertical axis wind turbine blade. Many of the embodiments described herein pertain to a portion of the centroid axis being angularly displaced ahead of or behind a disparate portion of the centroid axis. It is to be appreciated, however, that such relative angular displacements can be based on other spanwise axes of the vertical axis wind turbine blade (e.g., a leading edge axis that is a locus of points corresponding to respective leading edges of airfoil cross-sections of the vertical axis wind turbine blade along the span of the vertical axis wind turbine blade, a trailing edge axis that is a locus of points corresponding to respective trailing edges of airfoil cross-sections of the vertical axis wind turbine blade along the space of the vertical axis wind turbine blade, etc.).

Pursuant to various examples, the airfoil cross-sections of the vertical axis wind turbine blades can be symmetric airfoils. However, according to other examples, it is to be appreciated that the airfoil cross-sections of the vertical axis wind turbine blades can be asymmetric airfoils. For instance, substantially any shaped airfoil is intended to fall within the scope of the hereto appended claims.

Set forth herein are various vertical axis wind turbine blades configured to rotate about a rotation axis. The vertical axis wind turbine blades described herein can twist in proportion to a rate of rotation about the rotation axis to passively control overspeed. Moreover, the vertical axis wind turbine blades presented herein can twist into an airflow direction when the vertical axis wind turbine blades are aerodynamically loaded to smooth cyclic load and power variation. Coupling blade twist with rotational or aerodynamic loading of vertical axis wind turbine blades can increase turbine efficiency, smooth power output, and provide for aerodynamic braking during operation.

According to an example, geometric sweep of a blade structure can cause a vertical axis wind turbine blade to twist in proportion to a rate of rotation about the rotation axis to passively control overspeed and twist into an airflow direction when the vertical axis wind turbine blade is aerodynamically loaded to smooth cyclic load and power variation. Following this example, various vertical axis wind turbine blade designs with rear swept segments are herein (e.g., sweep-twist-coupled configurations), where such rear swept segments can be configured to twist the vertical axis wind turbine blades into an airflow direction when the vertical axis wind turbine blade is aerodynamically loaded to smooth cyclic load and power variation. Moreover, the rear swept segments can be configured to increasingly twist the vertical axis wind turbine blade in proportion to a rate of rotation about the rotation axis to increase drag for passive overspeed control.

A rear swept segment positions mass of a vertical axis wind turbine blade behind other portions of the blade in a direction of rotation about a rotation axis. Thus, as the blade rotates around the rotation axis, the mass can pull outwards, which can twist the blade.

By way of another example, orientation of fibers of an orthotropic laminate within a blade structure (e.g., for extension-twist-coupled and bend-twist-coupled configurations) can cause a vertical axis wind turbine blade to twist in proportion to a rate of rotation about the rotation axis to passively control overspeed and twist into an airflow direction when the vertical axis wind turbine blade is aerodynamically loaded to smooth cyclic load and power variation.

Referring now to the drawings, FIGS. 1-4 illustrate an exemplary sweep-twist-coupled Darrieus vertical axis wind turbine 100. More particularly, FIG. 1 illustrates a first side view of the sweep-twist-coupled Darrieus vertical axis wind turbine 100, FIG. 2 illustrates a second side view of the sweep-twist-coupled Darrieus vertical axis wind turbine 100, FIG. 3 illustrates a top view of the sweep-twist-coupled Darrieus vertical axis wind turbine 100, and FIG. 4 illustrates an isometric view of the sweep-twist-coupled Darrieus vertical axis wind turbine 100. In the below discussion of the sweep-twist-coupled Darrieus vertical axis wind turbine 100, reference is collectively made to FIGS. 1-4.

The sweep-twist-coupled Darrieus vertical axis wind turbine 100 includes a plurality of vertical axis wind turbine blades, namely, a first vertical axis wind turbine blade 102, a second vertical axis wind turbine blade 104, and a third vertical axis wind turbine blade 106 (collectively referred to herein as vertical axis wind turbine blades 102-106). While three vertical axis wind turbine blades 102-106 are illustrated as being included in the sweep-twist-coupled Darrieus vertical axis wind turbine 100, it is to be appreciated that fewer than or more than three such blades can be included therein. Moreover, the sweep-twist-coupled Darrieus vertical axis wind turbine 100 includes a tower 108 that extends along a rotation axis 110 (e.g., the rotation axis 110 is represented as a dotted line).

Each of the vertical axis wind turbine blades 102-106 of the sweep-twist-coupled Darrieus vertical axis wind turbine 100 can have a troposkein, or "spinning rope" shape, but non-troposkein shapes for the vertical axis wind turbine blades 102-106 are also contemplated. Moreover, the vertical axis wind turbine blades 102-106 are coupled with the tower 108. Each of the vertical axis wind turbine blades 102-106 is coupled with the tower 108 at two ends (e.g., a top end and a bottom end of the vertical axis wind turbine blade 102 is coupled with the tower 108, etc.). Further, the vertical axis wind turbine blades 102-106 are configured to rotate about the rotation axis 110. FIG. 3 illustrates a direction of rotation 142 for the sweep-twist-coupled Darrieus vertical axis wind turbine 100. Moreover, a wind direction 144 is depicted in FIG. 3.

The vertical axis wind turbine blades 102-106 of the sweep-twist-coupled Darrieus vertical axis wind turbine 100 are each swept in a direction of a trailing edge (e.g., rear sweep) towards a maximum angular displacement at a maximum radius from the rotation axis 110. For instance, a maximum angular displacement 140 of the vertical axis wind turbine blade 102 has a maximum radial distance 136 from the rotation axis 110. An effect of such sweeping is that the vertical axis wind turbine blades 102-106 can twist into an inflow direction when the blades 102-106 are aerodynamically loaded, which can smooth cyclic load and power variation. Moreover, as a rate of rotation of the vertical axis wind turbine blades 102-106 increases, a lateral part of the vertical axis wind turbine blades 102-106 can have an increasing amount of static twist, which can serve to increase drag over the entire rotation, thereby creating a passive speed limitation for overspeed control. Further, the vertical axis wind turbine blades 102-106 can also be swept towards a leading edge (e.g., forward sweep) near blade attachment points (e.g., attachment segments) to provide for pitch moment balancing.

A description of the vertical axis wind turbine blade 102 is set forth below. It is to be appreciated that the vertical axis wind turbine blade 104 and the vertical axis wind turbine blade 106 can be substantially similar to the vertical axis wind turbine blade 102 described below.

The vertical axis wind turbine blade 102 includes a first attachment segment 112, a first forward swept segment 116, a rear swept segment 120, a second forward swept segment 118, and a second attachment segment 114. For instance, the first forward swept segment 116 and the second forward swept segment 118 can balance torque loads along the vertical axis wind turbine blade 102. However, in accordance with other embodiments, it is contemplated that the vertical axis wind turbine blade 102 can optionally omit the first forward swept segment 116 and the second forward swept segment 118 (e.g., the first attachment segment 112 can be contiguous with the rear swept segment 120 and the rear swept segment 120 can be contiguous with the second attachment segment 114).

The first attachment segment 112 and the second attachment segment 114 are respectively coupleable with a tower (e.g., as depicted in FIGS. 1-4 the first attachment segment 112 and the second attachment segment 114 are coupled with the tower 108). The first attachment segment 112 includes a first portion of a centroid axis 122. The centroid axis 122 is represented as a dashed line along the span of the vertical axis wind turbine blade 102.

The first forward swept segment 116 includes a second portion of the centroid axis 122, a first proximal side 124, and a first distal side 126. As used herein pertaining to the sweep-twist-coupled Darrieus vertical axis wind turbine 100, proximal sides and distal sides are relative to the first attachment segment 112. The first proximal side 124 of the first forward swept segment 116 is contiguous with the first attachment segment 112. Further, the second portion of the centroid axis 122 of the first forward swept segment 116 is angularly displaced ahead of the first portion of the centroid axis 122 of the first attachment segment 112 in the direction of rotation 142 about the rotation axis 110. For instance, FIG. 1 shows such relative angular displacement between the first and second portions of the centroid axis 122. More particularly, the first forward swept segment 116 is illustrated as being canted towards a leading edge (e.g., to the left in the illustrated view of FIG. 1) relative to the first attachment segment 112 (e.g., the second portion of the centroid axis 122 of the first forward swept segment 116 is left of the first portion of the centroid axis 122 of the first attachment segment 112 in FIG. 1).

The rear swept segment 120 includes a third portion of the centroid axis 122, a second proximal side 128, and a second distal side 130. The second proximal side 128 of the rear swept segment 120 is contiguous with the first distal side 126 of the first forward swept segment 116. Further, the third portion of the centroid axis 122 of the rear swept segment 120 is angularly displaced behind the first portion of the centroid axis 122 of the first attachment segment 112 in the direction of rotation 142 about the rotation axis 110. Such angular displacement behind the first portion of the centroid axis 122 of the first attachment segment 112 is shown, for example, in FIG. 1, where the third portion of the centroid axis 122 of the rear swept segment 120 is right of the first portion of the centroid axis 122 of the first attachment segment 112. Thus, as depicted in FIG. 1, the rear swept segment 120 is illustrated as being canted towards a trailing edge (e.g., to the right in the illustrated view of FIG. 1) relative to the first attachment segment 112.

The sweep-twist-coupled Darrieus vertical axis wind turbine blade 100 further includes the second forward swept segment 118, where the second forward swept segment 118 includes a fourth portion of the centroid axis 122, a third proximal side 132, and a third distal side 134. The third proximal side 132 of the second forward swept segment 118 is contiguous with the second distal side 130 of the rear swept segment 120. Further, the fourth portion of the centroid axis 122 of the second forward swept segment 118 is angularly displaced ahead of the first portion of the centroid axis 122 of the first attachment segment 112 in the direction of rotation 142 about the rotation axis 110. The angular displacement ahead of the first portion of the centroid axis 122 of the first attachment segment 112 is shown, for instance, in FIG. 1; as illustrated, the fourth portion of the centroid axis 122 of the second forward swept segment 118 is left of the first portion of the centroid axis 122 of the first attachment segment 112. Accordingly, as depicted in FIG. 1, the second forward swept segment 118 is illustrated as being canted towards a leading edge (e.g., to the left in the illustrated view of FIG. 1) relative to the first attachment segment 112.

Moreover, the second attachment segment 114 includes a fifth portion of the centroid axis 122. The second attachment segment 114 is contiguous with the third distal side 134 of the second forward swept segment 118.

FIG. 3 depicts an angular position 138 of the first portion of the centroid axis 122 within a revolution around the rotation axis 110. The angular position 138 of the first portion of the centroid axis 122 is shown as a dashed line. As illustrated, the rear swept segment 120 is angularly displaced behind the angular position 138 in the direction of rotation 142 about the rotation axis 110. Moreover, the second forward swept segment 118 is angularly displaced ahead of the angular position 138 in the direction of rotation 142 about the rotation axis 110.

Moreover, the first portion of the centroid axis 122 of the first attachment segment 112 and the fifth portion of the centroid axis 122 of the second attachment segment 114 are at substantially similar angular positions about the rotation axis 110. For instance, as shown in FIG. 1, the first attachment segment 112 and the second attachment segment 114 are illustrated as being inline vertically. It is contemplated that substantially similar can mean less than or equal to a five degree angular displacement between the first attachment segment 112 and the second attachment segment 114 in the direction of rotation 142 about the rotation axis 110; yet, it is contemplated that the claimed subject matter is not so limited.

Moreover, the vertical axis wind turbine blade 102 has a maximum angular displacement 140 within the rear swept segment 120 at a maximum radial distance 136 between the rotation axis 110 and the vertical axis wind turbine blade 102. Accordingly, the third portion of the centroid axis 122 of the rear swept segment 120 has, at the maximum radial distance 136 between the rotation axis 110 and the vertical axis wind turbine blade 102, the maximum angular displacement 140 behind the first portion of the centroid axis 122 of the first attachment segment 112 in the direction of rotation 142 about the rotation axis 110.

Now turning to FIGS. 5-8, illustrated is an exemplary sweep-twist-coupled U-shaped vertical axis wind turbine 500. Moreover, it is contemplated that the sweep-twist-coupled U-shaped vertical axis wind turbine 500 shown in FIGS. 5-8 can be similar to a sweep-twist-coupled V-shaped vertical axis wind turbine (e.g., blades of a sweep-twist-coupled V-shaped vertical axis wind turbine can be outwardly slanted rather than convexly curved). For sake of brevity, such sweep-twist-coupled V-shaped vertical axis wind turbine is not shown herein.

Figure 6:
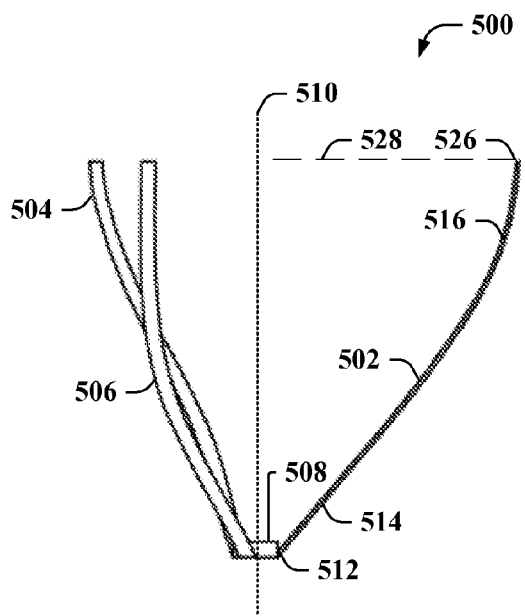
Figure 7:
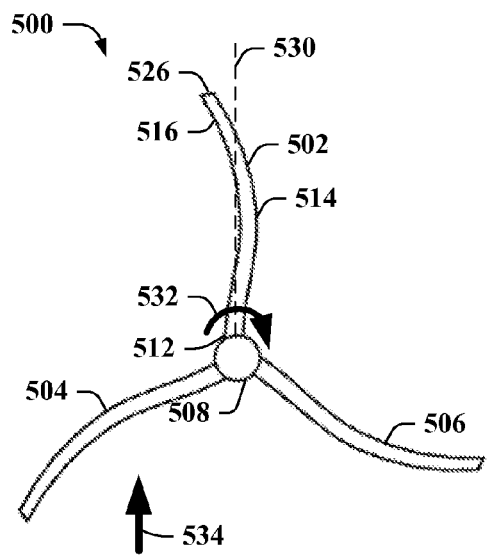
Figure 8:
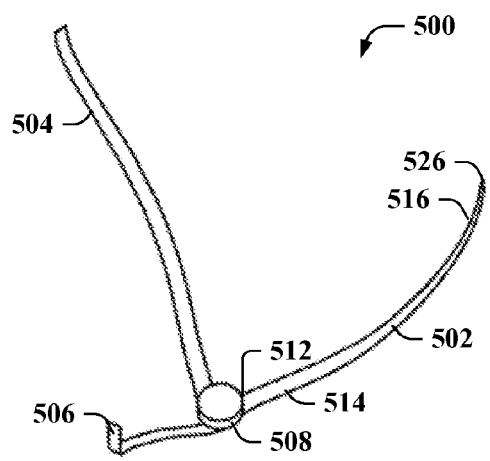

FIG. 5 depicts a first side view of the sweep-twist-coupled U-shaped vertical axis wind turbine 500, FIG. 6 illustrates a second side view of the sweep-twist-coupled U-shaped vertical axis wind turbine 500, FIG. 7 illustrates a top view of the sweep-twist-coupled U-shaped vertical axis wind turbine 500, and FIG. 8 illustrates an isometric view of the sweep-twist-coupled U-shaped vertical axis wind turbine 500. Reference is collectively made to FIGS. 5-8 in the below description of the sweep-twist-coupled U-shaped vertical axis wind turbine 500.

Similar to the sweep-twist-coupled Darrieus vertical axis wind turbine 100 shown in FIGS. 1-4, the sweep-twist-coupled U-shaped vertical axis wind turbine 500 includes three vertical axis wind turbine blades. More particularly, the sweep-twist-coupled U-shaped vertical axis wind turbine 500 includes a first vertical axis wind turbine blade 502, a second vertical axis wind turbine blade 504, and a third vertical axis wind turbine blade 506 (collectively referred to herein as vertical axis wind turbine blades 502-506). Again, it is contemplated that the sweep-twist-coupled U-shaped vertical axis wind turbine 500 can include substantially any number of such blades and, accordingly, is not limited to the depicted illustration.

Moreover, the sweep-twist-coupled U-shaped vertical axis wind turbine 500 includes a tower 508. As shown, the tower 508 can be a hub; yet, it is contemplated that the claimed subject matter is not so limited. Moreover, the vertical axis wind turbine blades 502-506 are configured to rotate about a rotation axis 510 that extends through the tower 508 in a direction of rotation 532 (e.g., the rotation axis 510 is represented as a dotted line). Further, a wind direction 534 is illustrated in FIG. 7.

The vertical axis wind turbine blades 502-506 of the sweep-twist-coupled U-shaped vertical axis wind turbine 500 are each swept in a direction of a trailing edge from towards a respective tip. An effect of such sweep is that the vertical axis wind turbine blades 502-506 can twist into an airflow direction when the blades 502-506 are aerodynamically loaded, which can smooth cyclical load and power variation. Additionally, as the rate of rotation about the rotation axis 510 increases, the vertical axis wind turbine blades 502-506 can bend due to centrifugal forces, causing a lateral surface of such blades 502-506 to have an increasing amount of static twist that can serve to increase drag over an entire rotation about the rotation axis 510. Such static twist can create a passive speed limitation for overspeed control. Moreover, the vertical axis wind turbine blades 502-506 can be swept towards the leading edge near blade attachment points (e.g., attachment segments) to provide for pitch moment balancing.

Again, a description is set forth below for one of the vertical axis wind turbine blades 502-506, namely, the vertical axis wind turbine blade 502. It is contemplated that the vertical axis wind turbine blade 504 and the vertical axis wind turbine blade 506 can be substantially similar to the vertical axis wind turbine blade 502 as set forth below.

The vertical axis wind turbine blade 502 includes an attachment segment 512, a forward swept segment 514, and a rear swept segment 516. The forward swept segment 514 can balance torque loads along the vertical axis wind turbine blade 502. However, in accordance with other embodiments, it is contemplated that the vertical axis wind turbine blade 502 can optionally omit the forward swept segment 514 (e.g., the attachment segment 512 can be contiguous with the rear swept segment 516).

The attachment segment 512 is coupleable with a tower (e.g., the attachment segment 512 is coupled with the tower 508 in FIGS. 5-8). The attachment segment 512 includes a first portion of a centroid axis 518, where the centroid axis 518 is represented as a dashed line along the span of the vertical axis wind turbine blade 502.

The forward swept segment 514 includes a second portion of the centroid axis 518, a first proximal side 520, and a first distal side 522. As used herein pertaining to the sweep-twist-coupled U-shaped vertical axis wind turbine 500, proximal sides and distal sides are relative to the attachment segment 512. The first proximal side 520 of the forward swept segment 514 is contiguous with the attachment segment 512. Moreover, the second portion of the centroid axis 518 of the forward swept segment 514 is angularly displaced ahead of the first portion of the centroid axis 518 of the attachment segment 512 in the direction of rotation 532 about the rotation axis 510. For instance, FIG. 5 shows the relative angular displacement between the first and second portions of the centroid axis 518. The forward swept segment 514 is illustrated as being canted towards a leading edge (e.g., to the left in the illustrated view of FIG. 5) relative to the attachment segment 512; thus, the second portion of the centroid axis 518 of the forward swept segment 514 is left of the first portion of the centroid axis 518 of the attachment segment 512 in FIG. 5.

Moreover, the rear swept segment 516 includes a third portion of the centroid axis 518, a second proximal side 524, and a second distal side 526. The second proximal side 524 of the rear swept segment 516 is contiguous with the first distal side 522 of the forward swept segment 514. Further, the third portion of the centroid axis 518 of the rear swept segment 516 is angularly displaced behind the first portion of the centroid axis 518 of the attachment segment 512 in the direction of rotation 532 about the rotation axis 510. The angular displacement behind the first portion of the centroid axis 518 of the attachment segment 512 is shown, for example, in FIG. 5, where the third portion of the centroid axis 518 of the rear swept segment 516 is right of the first portion of the centroid axis 518 of the attachment segment 512. Thus, as depicted in FIG. 5, the rear swept segment 516 is illustrated as being canted towards a trailing edge (e.g., to the right in the illustrated view of FIG. 5) relative to the attachment segment 512.

FIG. 7 depicts an angular position 530 of the first portion of the centroid axis 518 within a revolution around the rotation axis 110. The angular position 530 of the first portion of the centroid axis 518 is shown as a dashed line. As illustrated, the rear swept segment 516 is angularly displaced behind the angular position 530 in the direction of rotation 532 about the rotation axis 510. Moreover, the forward swept segment 514 is angularly displaced ahead of the angular position 530 in the direction of rotation 532 about the rotation axis 510.

Further, the attachment segment 512 is a root of the vertical axis wind turbine blade 502 and the second distal side 526 of the rear swept segment 516 is a tip of the vertical axis wind turbine blade 502. As shown in FIG. 6, a radial distance between the rotation axis 510 and the vertical axis wind turbine blade 502 increases along the span of the vertical axis wind turbine blade 502 towards a maximum radial distance 528 at the tip (e.g., the second distal side 526).

Moreover, as depicted in FIG. 6, the vertical axis wind turbine blade 502 is convexly curved towards a lateral surface of the vertical axis wind turbine blade 502. However, according to other embodiments (e.g., for a sweep-twist-coupled V-shaped vertical axis wind turbine), a vertical axis wind turbine blade can be outwardly slanted relative to a rotation axis from an attachment segment to a rear swept segment. However, it is contemplated that the claimed subject matter is not so limited.

Now turning to FIGS. 9-12, illustrated is an exemplary sweep-twist-coupled H-shaped vertical axis wind turbine 900. FIG. 9 depicts a first side view of the sweep-twist-coupled H-shaped vertical axis wind turbine 900, FIG. 10 illustrates a second side view of the sweep-twist-coupled H-shaped vertical axis wind turbine 900, FIG. 11 illustrates a top view of the sweep-twist-coupled H-shaped vertical axis wind turbine 900, and FIG. 12 illustrates an isometric view of the sweep-twist-coupled H-shaped vertical axis wind turbine 900.

Similar to above, the sweep-twist-coupled H-shaped vertical axis wind turbine 900 includes three blades: a first vertical axis wind turbine blade 902, a second vertical axis wind turbine blade 904, and a third vertical axis wind turbine blade 906 (collectively referred to herein as vertical axis wind turbine blades 902-906). Again, it is contemplated that the sweep-twist-coupled H-shaped vertical axis wind turbine 900 can include substantially any number of vertical axis wind turbine blades 902-906, and is not limited to the three blades as illustrated in FIGS. 9-12.

The sweep-twist-coupled H-shaped vertical axis wind turbine 900 further includes a tower 908 that extends along a rotation axis 910 (e.g., the rotation axis 910 is represented as a dotted line). Moreover, the vertical axis wind turbine blades 902-906 are configured to rotate about the rotation axis 910 in a direction of rotation 950. Further, a wind direction 952 is depicted in FIG. 11.

The sweep-twist-coupled H-shaped vertical axis wind turbine 900 further includes struts: a first strut 940, a second strut 942, and a third strut 944 (collectively referred to as struts 940-944). Each of the vertical axis wind turbine blades 902-906 is coupled with a respective one of the struts 940-944. For instance, a first end of the strut 940 is coupled with the vertical axis wind turbine blade 902, and a second end of the strut 940 (e.g., opposite the first end) is coupled with the tower 908. The struts 942 and 944 are similarly coupled with the vertical axis wind turbine blades 904 and 906.

Similar to the above discussion pertaining to the sweep-twist-coupled U-shaped vertical axis wind turbine 500 of FIG. 5, the vertical axis wind turbine blades 902-906 of the sweep-twist-coupled H-shaped vertical axis wind turbine 900 can each be swept in a direction of a trailing edge towards a tip (e.g., the second distal side 930 and the fourth distal side 938).

The effect of such sweeping is that the vertical axis wind turbine blades 902-906 can twist into an inflow direction when the blades 902-906 are aerodynamically loaded, which can smooth cyclic load and power variation. Additionally, as the rate of rotation increases, the vertical axis wind turbine blades 902-906 can bend due to centrifugal forces, causing lateral surfaces of the blades 902-906 to have an increasing amount of static twist that can serve to increase drag over an entire rotation, thereby providing passive speed limitation, which can provide overspeed control. Moreover, the vertical axis wind turbine blades 902-906 can be swept towards the leading edge near attachment points (e.g., attachment segments) of such blades 902-906, which can provide for pitch moment balance.

The vertical axis wind turbine blade 902 is described in further detail below. It is to be appreciated that the vertical axis wind turbine blade 904 and the vertical axis wind turbine blade 906 can be substantially similar to the below description of the vertical axis wind turbine blade 902.

The vertical axis wind turbine blade 902 includes an attachment segment 912, a first forward swept segment 914, a second forward swept segment 916, a first rear swept segment 918, and a second rear swept segment 920. For instance, the first forward swept segment 914 and the second forward swept segment 916 can balance torque loads along the vertical axis wind turbine blade 902. However, in accordance with other embodiments, it is contemplated that the vertical axis wind turbine blade 902 can optionally omit the first forward swept segment 914 and the second forward swept segment 916 (e.g., the attachment segment 912 can be contiguous with the first rear swept segment 918 and the second rear swept segment 920).

The attachment segment 912 can be a root of the vertical axis wind turbine blade 902. Moreover, the attachment segment 912 is coupleable with a first end of a strut, where a second end of the strut is coupleable with a tower; as depicted, the attachment segment 912 is coupled with the first end of the strut 940, and the second end of the strut 940 is coupled with the tower 908. Further, the attachment segment 912 includes a first portion of a centroid axis 922, where the centroid axis 922 is represented as a dashed line along the span of the vertical axis wind turbine blade 902.

The first forward swept segment 914 includes a second portion of the centroid axis 922, a first proximal side 924, and a first distal side 926. As used herein pertaining to the sweep-twist-coupled H-shaped vertical axis wind turbine 900, proximal sides and distal sides are relative to the attachment segment 912. The first proximal side 924 of the first forward swept segment 914 is contiguous with the attachment segment 912. Further, the second portion of the centroid axis 922 of the first forward swept segment 914 is angularly displaced ahead of the first portion of the centroid axis 922 of the attachment segment 912 in the direction of rotation 950 about the rotation axis 910.

The first rear swept segment 918 includes a third portion of the centroid axis 922, a second proximal side 928, and a second distal side 930. The second proximal side 928 of the first rear swept segment 918 is contiguous with the first distal side 926 of the first forward swept segment 914. Moreover, the third portion of the centroid axis 922 of the first rear swept segment 918 is angularly displaced behind the first portion of the centroid axis 922 of the attachment segment 912 in the direction of rotation 950 about the rotation axis 910.

The second forward swept segment 916 includes a fourth portion of the centroid axis 922, a third proximal side 932, and a third distal side 934. The third proximal side 932 of the second forward swept segment 916 is contiguous with the attachment segment 912. As illustrated, the first forward swept segment 914 and the second forward swept segment 916 are at opposite sides of the attachment segment 912 in a vertical direction. Moreover, the fourth portion of the centroid axis 922 of the second forward swept segment 916 is angularly displaced ahead of the first portion of the centroid axis 922 of the attachment segment 912 in the direction of rotation 950 about the rotation axis 910.

The second rear swept segment 920 includes a fifth portion of the centroid axis 922, a fourth proximal side 936, and a fourth distal side 938. The fourth proximal side 936 of the second rear swept segment 920 is contiguous with the third distal side 934 of the second forward swept segment 916. Moreover, the fifth portion of the centroid axis 922 of the second rear swept segment 920 is angularly displaced behind the first portion of the centroid axis 922 of the attachment segment 912 in the direction of rotation 950 about the rotation axis 910.

The second distal side 930 of the first rear swept segment 918 is a first tip of the vertical axis wind turbine blade 902. The fourth distal side 938 of the second rear swept segment 920 is a second tip of the vertical axis wind turbine blade 902. As illustrated in FIG. 10, a first radial distance 946 between the rotation axis 910 and the first tip is substantially similar to a second radial distance 948 between the rotation axis 910 and the second tip (e.g., substantially similar can be less than five percent difference).

In accordance with other embodiments, rather than including a sweep in a blade structure, orientation of fibers of an orthotropic laminate can cause a vertical axis wind turbine blade to twist. For instance, the orientation of the fibers of the orthotropic laminate from which a vertical axis wind turbine blade is made can cause the vertical axis wind turbine blade to twist in proportion to a rate of rotation about a rotation axis, which can passively control overspeed. Moreover, the orientation of the fibers of the orthotropic laminate can cause the vertical axis wind turbine blade to turn into an airflow direction when the vertical axis wind turbine blade is aerodynamically loaded, which can smooth cyclic load and power variation. The fibers of the orthotropic laminate can be rotated with respect to a blade axis of the vertical axis wind turbine blade (e.g., rather than the fibers being parallel to the blade axis). For example, the blade axis of the vertical axis wind turbine blade can be a centroid axis of the vertical axis wind turbine blade.

An orthotropic laminate from which a vertical axis wind turbine blade is constructed can be a composite material that includes fibers. Examples of the fibers include glass fibers, carbon fibers, Kevlar, or the like. For instance, the composite material can be glass fibers with surrounding plastic, carbon fibers with surrounding plastic, etc.; yet, the claimed subject matter is not limited to the foregoing examples.

Figure 13:
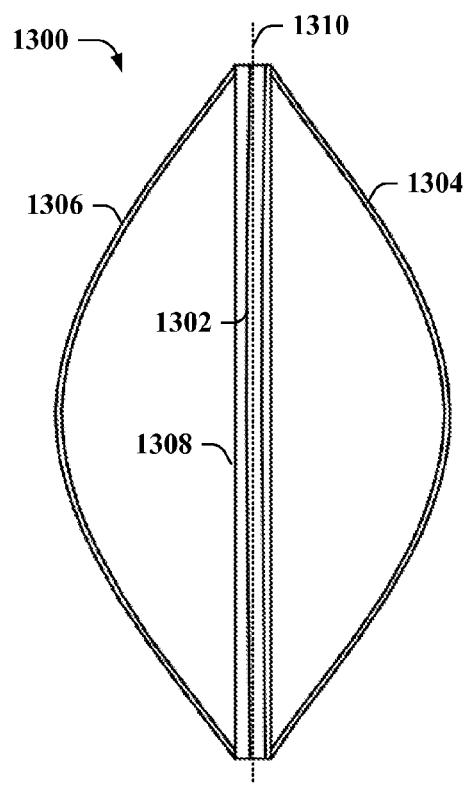
FIGS. 13-16 illustrate an exemplary extension-twist-coupled Darrieus vertical axis wind turbine.
Figure 14:
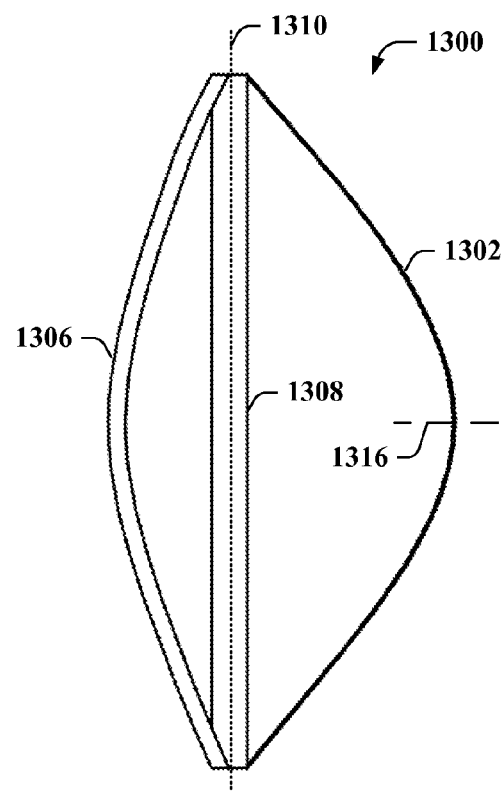
Figure 15:
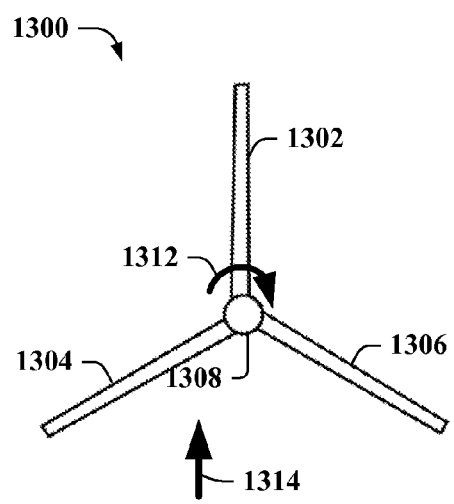
Figure 16:
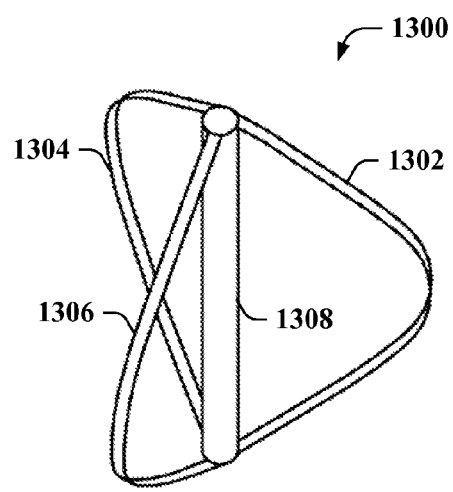

With reference to FIGS. 13-16, illustrated is an exemplary extension-twist-coupled Darrieus vertical axis wind turbine 1300. FIG. 13 illustrates a first side view of the extension-twist-coupled Darrieus vertical axis wind turbine 1300, FIG. 14 illustrates a second side view of the extension-twist-coupled Darrieus vertical axis wind turbine 1300, FIG. 15 illustrates a top view of the extension-twist-coupled Darrieus vertical axis wind turbine 1300, and FIG. 16 illustrates an isometric view of the extension-twist-coupled Darrieus vertical axis wind turbine 1300.

As illustrated, the extension-twist-coupled Darrieus vertical axis wind turbine 1300 includes three vertical axis wind turbine blades: a first vertical axis wind turbine blade 1302, a second vertical axis wind turbine blade 1304, and a third vertical axis wind turbine blade 1306 (collectively referred to herein as vertical axis wind turbine blades 1302-1306). Yet, it is to be appreciated that the claimed subject matter is not limited to the extension-twist-coupled Darrieus vertical axis wind turbine 1300 including the three blades 1302-1306, and instead can include more than or fewer than three such blades. In contrast to the sweep-twist-coupled Darrieus vertical axis wind turbine 100 shown in FIGS. 1-4, the vertical axis wind turbine blades 1302-1306 of the extension-twist-coupled Darrieus vertical axis wind turbine 1300 lack geometric sweeps. Again, the vertical axis wind turbine blades 1302-1306 can have a troposkein shape; however, other shapes of the vertical axis wind turbine blades 1302-1306 are also intended to fall within the scope of the hereto appended claims. Moreover, the vertical axis wind turbine blades 1302-1306 are each coupled with a tower 1308 that extends along a rotation axis 1310. FIG. 15 illustrates a direction of rotation 1312 of the extension-twist-coupled Darrieus vertical axis wind turbine 1300 and a wind direction 1314.

Figure 17:
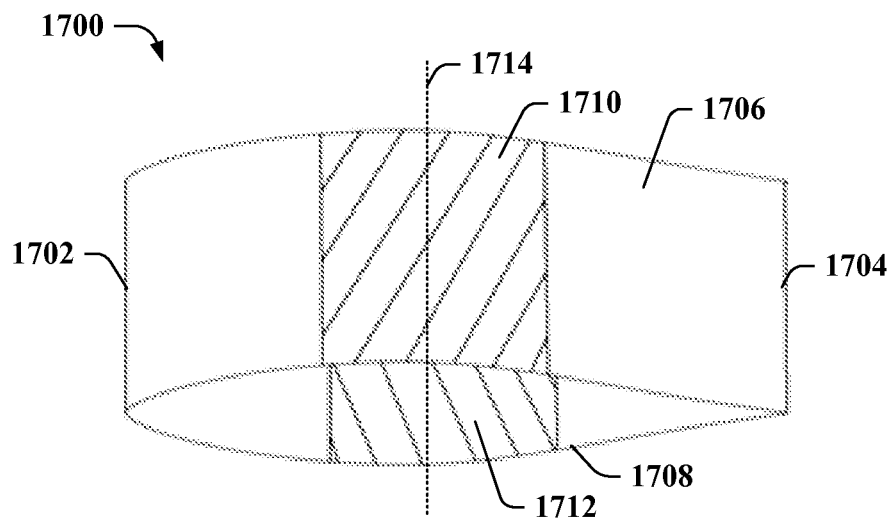
FIGS. 17-18 illustrate exemplary portions of a vertical axis wind turbine blade of the extension-twist-coupled Darrieus vertical axis wind turbine of FIGS. 13-16.
Figure 18:
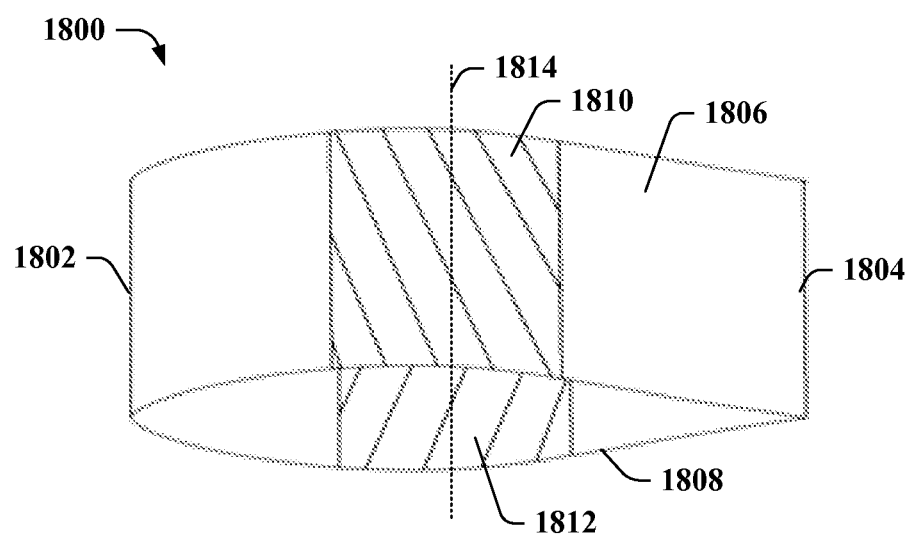

With reference to FIGS. 17-18, illustrated are side views of exemplary portions of the vertical axis wind turbine blade 1302 of the extension-twist-coupled Darrieus vertical axis wind turbine 1300 of FIGS. 13-16. More particularly, FIG. 17 illustrates a portion 1700 of the vertical axis wind turbine blade 1302 of FIGS. 13-16 below a mid-line 1316, and FIG. 18 illustrates a portion 1800 of the vertical axis wind turbine blade 1302 of FIGS. 13-16 above the mid-line 1316. The mid-line 1316 can be a airfoil cross-section that has a maximum radial distance between the rotation axis 1310 and the vertical axis wind turbine blade 1302, for example. Both side views of FIGS. 17-18 are viewed as looking downwind as the vertical axis wind turbine blade 1302 passes in front of the rotation axis 1310 (e.g., a view of the vertical axis wind turbine blade 1302 as illustrated in FIG. 13).

Turning to FIG. 17, the portion 1700 of the vertical axis wind turbine blade 1302 includes a nose 1702, a tail 1704, a lateral surface 1706, and a medial surface 1708. The lateral surface 1706 can be constructed of layers of an orthotropic laminate 1710 with fibers rotated clockwise with respect to a blade axis 1714 from the view depicted in FIG. 17. For example, the fibers of the orthotropic laminate 1710 can be rotated clockwise between 0 and 45° with respect to the blade axis 1714. The medial surface 1708 can be constructed of layers of an orthotropic laminate 1712 with fibers rotated counter-clockwise with respect to the blade axis 1714 from the view depicted in FIG. 17. According to an example, the fibers of the orthotropic laminate 1712 can be rotated counter-clockwise between 0 and 45° with respect to the blade axis 1714. Thus, the fibers of the orthotropic laminate 1710 on the lateral surface 1706 can be oriented in an opposite direction as compared to fibers of the orthotropic laminate 1712 on the medial surface 1708.

As shown in FIG. 18, the portion 1800 of the vertical axis wind turbine blade 1302 includes a nose 1802, a tail 1804, a lateral surface 1806, and a medial surface 1808. Again, on opposing surfaces (e.g., the lateral surface 1806 and the medial surface 1808) of the portion 1800 of the vertical axis wind turbine blade 1302, the orthotropic laminate has opposite fiber directions. More particularly, the lateral surface 1806 can be constructed of layers of an orthotropic laminate 1810 with fibers rotated counter-clockwise with respect to a blade axis 1814 from the view depicted in FIG. 18. For example, the fibers of the orthotropic laminate 1810 can be rotated counter-clockwise between 15 and 30° with respect to the blade axis 1814. The medial surface 1808 can be constructed of layers of an orthotropic laminate 1812 with fibers rotated clockwise with respect to the blade axis 1814 from the view depicted in FIG. 18. According to an example, the fibers of the orthotropic laminate 1812 can be rotated clockwise between 15 and 30° with respect to the blade axis 1814. Thus, the fibers of the orthotropic laminate 1810 on the lateral surface 1806 can be oriented in an opposite direction as compared to fibers of the orthotropic laminate 1812 on the medial surface 1808.

As the extension-twist-coupled Darrieus vertical axis wind turbine 1300 of FIGS. 13-16 is rotated around the rotation axis 1310, with the vertical axis wind turbine blades 1302-1306 each held at respective ends, such blades 1302-1306 are placed in tension. As the speed of rotation of the vertical axis wind turbine blades 1302-1306 around the rotation axis 1310 increases, the vertical axis wind turbine blades 1302-1306 stretch. Such stretching causes the fibers of the orthotropic laminate to twist the vertical axis wind turbine blades 1302-1306. For instance, the nose 1702 of the portion 1700 is pitched inwards (e.g., since the portion 1700 is from below the mid-line 1316) when the vertical axis wind turbine blade 1302 extends. Similarly, the nose 1802 of the portion 1800 is pitched inwards (e.g., since the portion 1800 is from above the mid-line 1316) when the vertical axis wind turbine blade 1302 extends. The inward twisting can increase drag, which can provide a stopping force for overspeed control.

Figure 19:
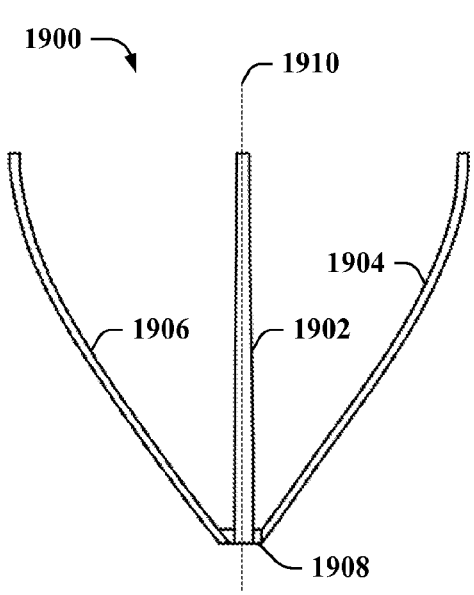
FIGS. 19-22 illustrate an exemplary bend-twist-coupled U-shaped vertical axis wind turbine.
Figure 20:
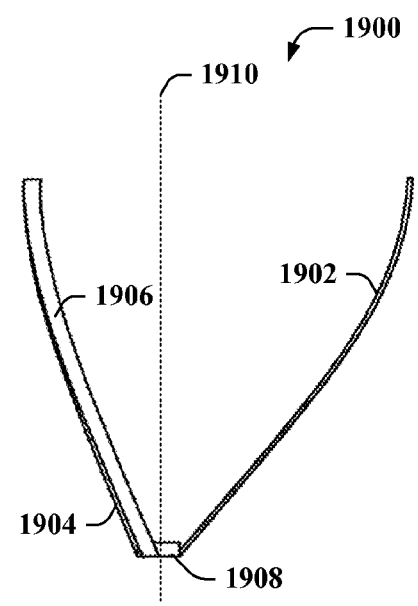
Figure 21:
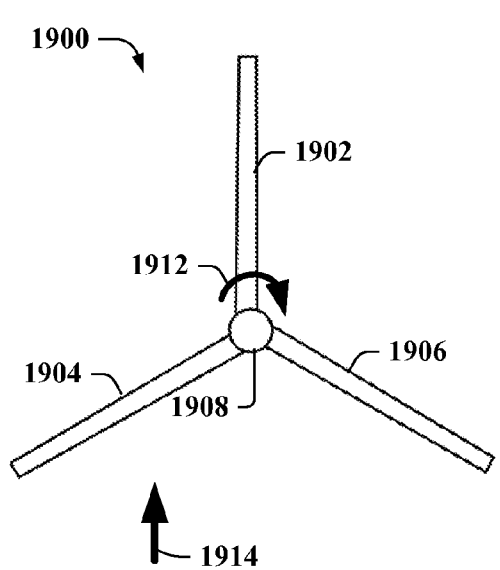
Figure 22:
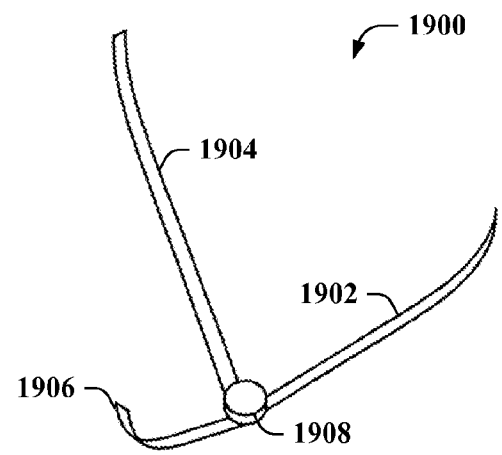

Now turning to FIGS. 19-22, illustrated is an exemplary bend-twist-coupled U-shaped vertical axis wind turbine 1900. FIG. 19 illustrates a first side view of the bend-twist-coupled U-shaped vertical axis wind turbine 1900, FIG. 20 illustrates a second side view of the bend-twist-coupled U-shaped vertical axis wind turbine 1900, FIG. 21 illustrates a top view of the bend-twist-coupled U-shaped vertical axis wind turbine 1900, and FIG. 22 illustrates an isometric view of the bend-twist-coupled U-shaped vertical axis wind turbine 1900.

Again, in the depicted example, the bend-twist-coupled U-shaped vertical axis wind turbine 1900 is shown as including three vertical axis wind turbine blades, namely, a first vertical axis wind turbine blade 1902, a second vertical axis wind turbine blade 1904, and a third vertical axis wind turbine blade 1906 (collectively referred to herein as vertical axis wind turbine blades 1902-1906); however, the claimed subject matter is not so limited. Moreover, roots of the vertical axis wind turbine blades 1902-1906 are respectively coupled with a tower 1908 (e.g., a hub), where the tower 1902 is along a rotation axis 1910. The vertical axis wind turbine blades 1902-1906 rotate about the rotation axis 1910 in a direction of rotation 1912 with a wind direction 1914. Further, for sake of brevity, it is to be appreciated that a bend-twist-coupled V-shaped vertical axis wind turbine can be substantially similar to the bend-twist-coupled U-shaped vertical axis wind turbine 1900 as described herein with blades outwardly slanted in the V-shaped vertical axis wind turbine rather than convexly curved as shown in FIGS. 19-22.

In contrast to the swept geometric design of the sweep-twist-coupled U-shaped vertical axis wind turbine 500 shown in FIGS. 5-8, the bend-twist-coupled U-shaped vertical axis wind turbine 1900 of FIGS. 19-22 twists due to orientation of orthotropic laminate fibers. More particularly, the vertical axis wind turbine blades 1902-1906 are constructed of layers of orthotropic laminate with fibers rotated with respect to a blade axis.

Figure 23:
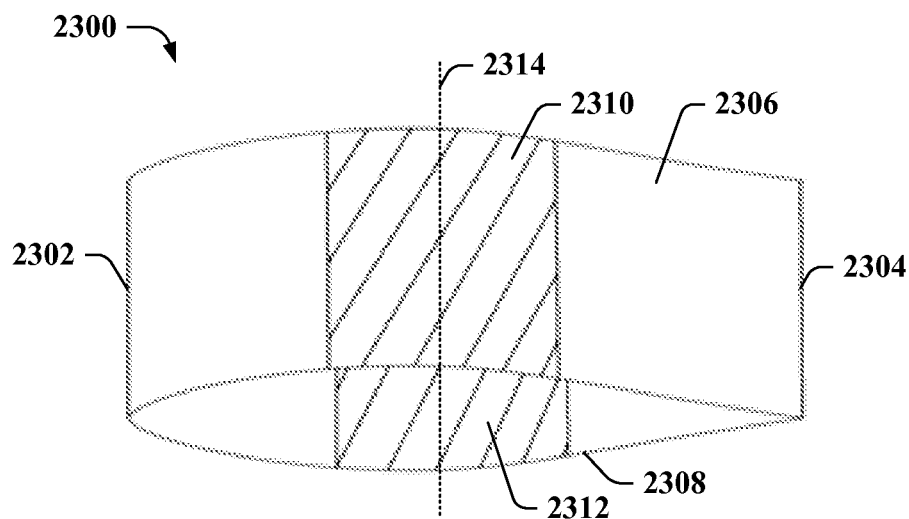
FIGS. 23-24 illustrate exemplary portions of vertical axis wind turbine blades of the bend-twist-coupled U-shaped vertical axis wind turbine of FIGS. 19-22 and a bend-twist-coupled H-shaped vertical axis wind turbine of FIGS. 25-28.

FIG. 23 illustrates a side view of a portion 2300 of the vertical axis wind turbine blade 1902 of the bend-twist-coupled U-shaped vertical axis wind turbine 1900 of FIGS. 19-22. The portion 2300 is viewed as looking downwind as the vertical axis wind turbine blade 1902 passes in front of the rotation axis 1910 (e.g., a view of the vertical axis wind turbine blade 1902 as depicted in FIG. 19).

The portion 2300 of the vertical axis wind turbine blade 1902 includes a nose 2302, a tail 2304, a lateral surface 2306, and a medial surface 2308. The lateral surface 2306 can be constructed of layers of an orthotropic laminate 2310 with fibers rotated clockwise with respect to a blade axis 2314 from the view depicted in FIG. 23. For example, the fibers of the orthotropic laminate 2310 can be rotated clockwise between 0 and 45° with respect to the blade axis 2314. The medial surface 2308 can be constructed of layers of an orthotropic laminate 2312 with fibers similarly rotated clockwise with respect to the blade axis 2314 from the view depicted in FIG. 23. According to an example, the fibers of the orthotropic laminate 2312 can be rotated clockwise between 0 and 45° with respect to the blade axis 2314. Thus, the fibers of the orthotropic laminate 2310 on the lateral surface 2306 can be oriented in a substantially similar direction as compared to fibers of the orthotropic laminate 2312 on the medial surface 2308. Accordingly, when the vertical axis wind turbine blade 1902 bends towards the tower 1908, the fibers of the orthotropic laminates 2310 and 2312 can cause the nose 2302 to be pitched inwards. Moreover, when the vertical axis wind turbine blade 1902 bends away from the tower 1908, the fibers of the orthotropic laminates 2310 and 2310 can cause the nose 2302 to be pitched outwards.

An effect of such rotation of the fibers of the orthotropic laminates 2310 and 2312 can be that the blade 1902 can twist into an inflow direction when the blade 1902 is aerodynamically loaded, which can smooth the cyclic load and power variation. Moreover, as the rate of rotation increases, the blade 1902 can bend due to centrifugal forces, which can cause the lateral surface 2306 of the blade to have an increasing amount of static twist that serves to increase drag over the entire rotation, which can create a passive speed limitation for overspeed control.

Figure 25:
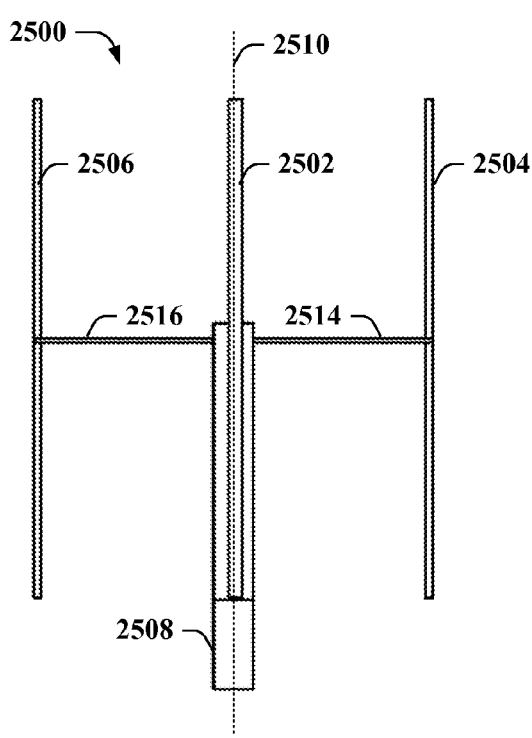
FIGS. 25-28 illustrate an exemplary bend-twist coupled H-shaped vertical axis wind turbine.
Figure 26:
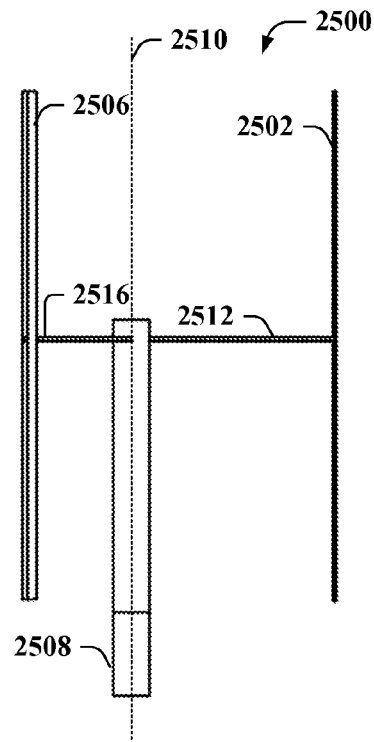
Figure 27:
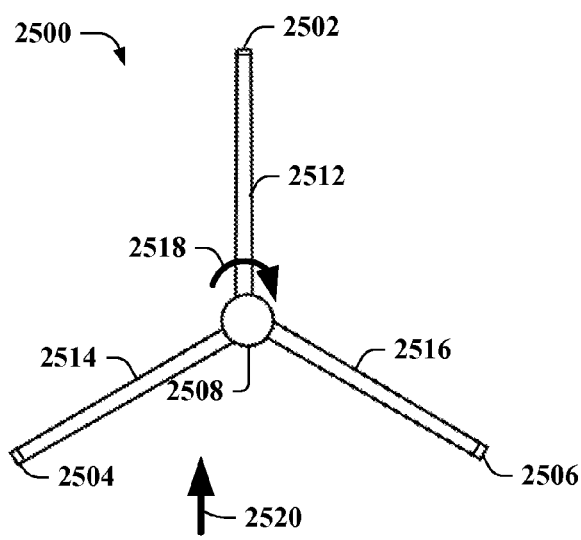
Figure 28:
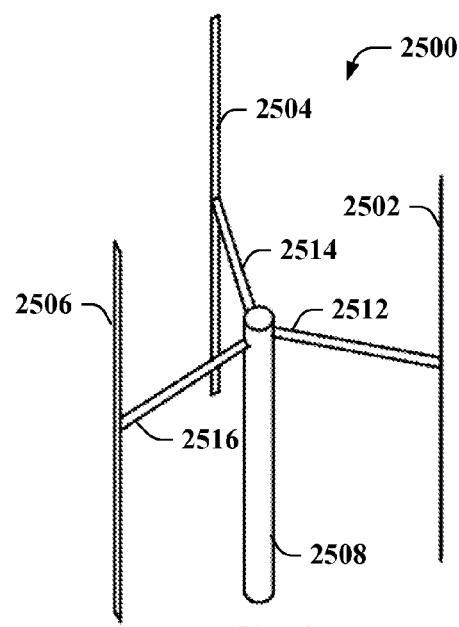

With reference to FIGS. 25-28, illustrated is an exemplary bend-twist coupled H-shaped vertical axis wind turbine 2500. FIG. 25 illustrates a first side view of the bend-twist coupled H-shaped vertical axis wind turbine 2500, FIG. 26 illustrates a second view of the bend-twist coupled H-shaped vertical axis wind turbine 2500, FIG. 27 illustrates a top view of the bend-twist coupled H-shaped vertical axis wind turbine 2500, and FIG. 28 illustrates an isometric view of the bend-twist coupled H-shaped vertical axis wind turbine 2500.

Again, the bend-twist coupled H-shaped vertical axis wind turbine 2500 is illustrated as including three vertical axis wind turbine blades: a first vertical axis wind turbine blade 2502, a second vertical axis wind turbine blade 2504, and a third vertical axis wind turbine blade 2506 (collectively referred to herein as vertical axis wind turbine blades 2502-2506). Yet, it is contemplated that other numbers of blades are intended to fall within the scope of the hereto appended claims. Each of the vertical axis wind turbine blades 2502-2506 are respectively coupled with a corresponding strut (e.g., the vertical axis wind turbine blade 2502 is coupled with a strut 2512, the vertical axis wind turbine blade 2504 is coupled with a strut 2514, and the vertical axis wind turbine blade 2506 is coupled with a strut 2516). Further, the struts 2512-2516 are coupled at opposite ends to a tower 2508, around which the blades 2502-2506 rotate (e.g., in a direction of rotation 2518 with a wind direction 2520). The tower 2508 extends along a rotation axis 2510 (depicted as a dotted line).

Similar to the bend-twist-coupled U-shaped vertical axis wind turbine 1900 of FIGS. 19-22, the vertical axis wind turbine blades 2502-2506 of the bend-twist-coupled H-shaped vertical axis wind turbine 2500 of FIGS. 25-28 are made of layers of orthotropic laminate rotated from a blade axis direction, wherein such rotation is in a substantially similar direction on medial and lateral surfaces. More particularly, the portion 2300 depicted in FIG. 23 also shows an orientation of the fibers of the orthotropic laminates for the vertical axis wind turbine blade 2502 above the strut 2512. Further, FIG. 24 illustrates a portion 2400 of the vertical axis wind turbine blade 2502 below the strut 2512.

Figure 24:
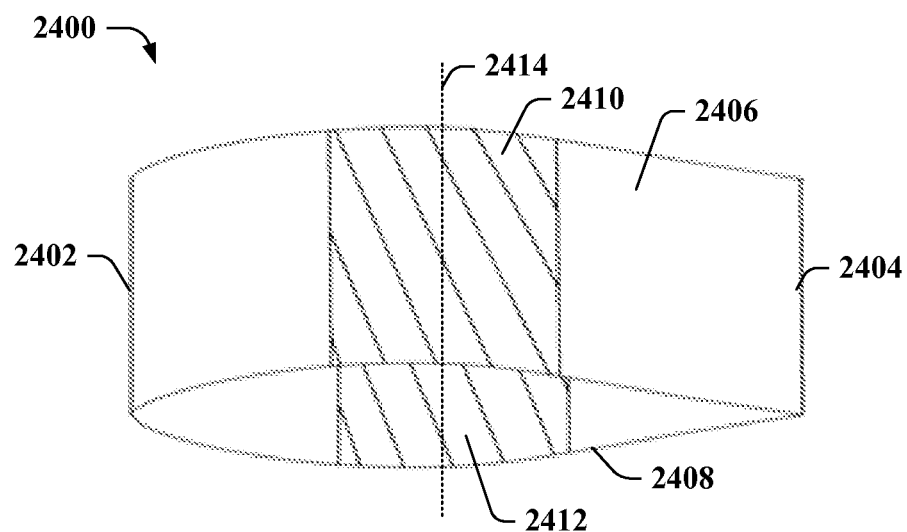

FIG. 24 illustrates a side view of the portion 2400 of the vertical axis wind turbine blade 2502 of the bend-twist-coupled H-shaped vertical axis wind turbine 2500 of FIGS. 25-28. The portion 2400 is viewed as looking downwind as the vertical axis wind turbine blade 2502 passes in front of the rotation axis 2510 (e.g., a view of the vertical axis wind turbine blade 2502 as depicted in FIG. 25).

The portion 2400 of the vertical axis wind turbine blade 2502 includes a nose 2402, a tail 2404, a lateral surface 2406, and a medial surface 2408. The lateral surface 2406 can be constructed of layers of an orthotropic laminate 2410 with fibers rotated counter-clockwise with respect to a blade axis 2414 from the view depicted in FIG. 24. For example, the fibers of the orthotropic laminate 2410 can be rotated counter-clockwise between 0 and 45° with respect to the blade axis 2414. The medial surface 2408 can be constructed of layers of an orthotropic laminate 2412 with fibers similarly rotated counter-clockwise with respect to the blade axis 2414 from the view depicted in FIG. 43. According to an example, the fibers of the orthotropic laminate 2412 can be rotated counter-clockwise between 0 and 45° with respect to the blade axis 2414. Thus, the fibers of the orthotropic laminate 2410 on the lateral surface 2406 can be oriented in a substantially similar direction as compared to fibers of the orthotropic laminate 2412 on the medial surface 2408.

Accordingly, when the vertical axis wind turbine blade 2502 bends towards the tower 2508, the fibers of the orthotropic laminates 2310 and 2312 above the strut 2514 can cause the nose 2302 to be pitched inwards, and the fibers of the orthotropic laminates 2410 and 2412 below the strut 2514 can cause the nose 2402 to be pitched inwards. When the vertical axis wind turbine blade 2502 bends away from the tower 2508, the fibers of the orthotropic laminates 2310 and 2312 above the strut 2514 can cause the nose 2302 to be pitched outwards, and the fibers of the orthotropic laminates 2410 and 2412 below the strut 2514 can cause the nose 2402 to be pitched outwards. Thus, similar to the bend-twist-coupled U-shaped vertical axis wind turbine 1900 of FIGS. 19-22, the vertical axis turbine blades 2502-2506 of the bend-twist-coupled H-shaped vertical axis wind turbine 2500 of FIGS. 25-28 can twist into an inflow direction when the blades 2502-2506 are aerodynamically loaded. Further, the blades 2502-2506 can bend due to centrifugal forces as the rate of rotation increases, which can cause lateral surfaces of the blade to have an increasing amount of static twist, which can increase drag over the entire rotation (e.g., providing passive speed limitation for overspeed control).

Further, as used herein, the term "exemplary" is intended to mean "serving as an illustration or example of something."

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A vertical axis wind turbine, comprising:
   a tower that extends along a rotation axis; and
   a vertical axis wind turbine blade configured to rotate about the rotation axis, wherein the vertical axis wind turbine blade further comprises:
      an attachment segment that comprises a first portion of a centroid axis, wherein the centroid axis is a locus of points corresponding to respective centroids of airfoil cross-sections of the vertical axis wind turbine blade along a span of the vertical axis wind turbine blade, and wherein the attachment segment is coupled with the tower;
      a forward swept segment that comprises a second portion of the centroid axis, a first proximal side, and a first distal side, wherein the first proximal side of the forward swept segment is contiguous with the attachment segment, and the second portion of the centroid axis of the forward swept segment is angularly displaced ahead of the first portion of the centroid axis of the attachment segment in a direction of rotation about the rotation axis; and
      a rear swept segment that comprises a third portion of the centroid axis, a second proximal side, and a second distal side, wherein the second proximal side of the rear swept segment is contiguous with the first distal side of the forward swept segment, and the third portion of the centroid axis of the rear swept segment is angularly displaced behind the first portion of the centroid axis of the attachment segment in the direction of rotation about the rotation axis;
   wherein the vertical axis wind turbine is a Darrieus vertical axis wind turbine, and wherein the vertical axis wind turbine blade further comprises:
      a second forward swept segment that comprises a fourth portion of the centroid axis, a third proximal side, and a third distal side, wherein the third proximal side of the second forward swept segment is contiguous with the second distal side of the rear swept segment, and the fourth portion of the centroid axis of the second forward swept segment is angularly displaced ahead of the first portion of the centroid axis of the attachment segment in the direction of rotation about the rotation axis; and
      a second attachment segment that comprises a fifth portion of the centroid axis, wherein the second attachment segment is contiguous with the third distal side of the second forward swept segment, and wherein the second attachment segment is coupled with the tower.

2. The vertical axis wind turbine of claim 1, wherein the first portion of the centroid axis of the attachment segment and the fifth portion of the centroid axis of the second attachment segment are at substantially similar angular positions about the rotation axis.

3. The vertical axis wind turbine of claim 1, wherein the third portion of the centroid axis of the rear swept segment has, at a maximum radial distance between the rotation axis and the vertical axis wind turbine blade, a maximum angular displacement behind the first portion of the centroid axis of the attachment segment in the direction of rotation about the rotation axis.

4. A vertical axis wind turbine blade configured to rotate about a rotation axis, comprising:
   an attachment segment that comprises a first portion of a centroid axis, wherein the centroid axis is a locus of points corresponding to respective centroids of airfoil cross-sections of the vertical axis wind turbine blade along a span of the vertical axis wind turbine blade;

a forward swept segment that comprises a second portion of the centroid axis, a first proximal side, and a first distal side, wherein the first proximal side of the forward swept segment is contiguous with the attachment segment, and the second portion of the centroid axis of the forward swept segment is angularly displaced ahead of the first portion of the centroid axis of the attachment segment in a direction of rotation about the rotation axis;

a rear swept segment that comprises a third portion of the centroid axis, a second proximal side, and a second distal side, wherein the second proximal side of the rear swept segment is contiguous with the first distal side of the forward swept segment, and the third portion of the centroid axis of the rear swept segment is angularly displaced behind the first portion of the centroid axis of the attachment segment in the direction of rotation about the rotation axis;

a second forward swept segment that comprises a fourth portion of the centroid axis, a third proximal side, and a third distal side, wherein the third proximal side of the second forward swept segment is contiguous with the second distal side of the rear swept segment, and the fourth portion of the centroid axis of the second forward swept segment is angularly displaced ahead of the first portion of the centroid axis of the attachment segment in the direction of rotation about the rotation axis; and a second attachment segment that comprises a fifth portion of the centroid axis, wherein the second attachment segment is contiguous with the third distal side of the second forward swept segment;

wherein the attachment segment and the second attachment segment are respectively coupleable with a tower that extends along the rotation axis.

5. The vertical axis wind turbine blade of claim 4, wherein the first portion of the centroid axis of the attachment segment and the fifth portion of the centroid axis of the second attachment segment are at substantially similar angular positions about the rotation axis.

6. The vertical axis wind turbine blade of claim 4, wherein the third portion of the centroid axis of the rear swept segment has, at a maximum radial distance between the rotation axis and the vertical axis wind turbine blade, a maximum angular displacement behind the first portion of the centroid axis of the attachment segment in the direction of rotation about the rotation axis.

7. The vertical axis wind turbine blade of claim 4, wherein the second distal side of the rear swept segment is a tip of the vertical axis wind turbine blade, and wherein a radial distance between the rotation axis and the vertical axis wind turbine blade increases along the span of the vertical axis wind turbine blade towards a maximum at the tip.

8. The vertical axis wind turbine blade of claim 7, wherein the vertical axis wind turbine blade is outwardly slanted relative to the rotation axis from the attachment segment to the rear swept segment.

9. The vertical axis wind turbine blade of claim 7, wherein the vertical axis wind turbine blade is convexly curved towards a lateral surface of the vertical axis wind turbine blade.

10. The vertical axis wind turbine blade of claim 4, wherein the airfoil cross-sections of the vertical axis wind turbine blade are symmetric airfoils.

11. The vertical axis wind turbine blade of claim 4, wherein the rear swept segment is configured to twist the vertical axis wind turbine blade into an airflow direction when the vertical axis wind turbine blade is aerodynamically loaded to smooth cyclic load and power variation.

12. The vertical axis wind turbine blade of claim 4, wherein the rear swept segment is configured to increasingly twist the vertical axis wind turbine blade in proportion to a rate of rotation about the rotation axis to increase drag for passive overspeed control.

* * * * *